(12) United States Patent
Domingues

(10) Patent No.: US 8,187,649 B2
(45) Date of Patent: *May 29, 2012

(54) PACKAGED, NON-DEVELOPED DOUGH PRODUCT IN LOW PRESSURE PACKAGE, AND RELATED COMPOSITIONS AND METHODS

(75) Inventor: David J. Domingues, Plymouth, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 493 days.

This patent is subject to a terminal disclaimer.

(21) Appl. No.: 11/132,831

(22) Filed: May 19, 2005

(65) Prior Publication Data

US 2005/0271773 A1    Dec. 8, 2005

Related U.S. Application Data

(60) Provisional application No. 60/572,463, filed on May 19, 2004.

(51) Int. Cl.
*A21D 10/02*      (2006.01)

(52) U.S. Cl. ........ 426/128; 426/496; 426/549; 426/551; 426/561

(58) Field of Classification Search .................. None
See application file for complete search history.

(56) References Cited

U.S. PATENT DOCUMENTS

| | | | |
|---|---|---|---|
| 6,261,613 B1 * | 7/2001 | Narayanaswamy et al. | 426/94 |
| 6,436,458 B2 * | 8/2002 | Kuechle et al. | 426/128 |
| 6,558,715 B1 * | 5/2003 | Rey et al. | 426/20 |
| 6,667,065 B1 * | 12/2003 | Kragh et al. | 426/28 |
| 2003/0049358 A1 * | 3/2003 | Domingues | 426/551 |
| 2004/0037936 A1 | 2/2004 | Domingues | |
| 2004/0208957 A1 | 10/2004 | Domingues | |
| 2004/0241292 A1 | 12/2004 | Geng et al. | |

* cited by examiner

*Primary Examiner* — Lien Tran

(74) *Attorney, Agent, or Firm* — Arlene L. Hornilla; Daniel C. Schulte

(57) ABSTRACT

Described are methods and compositions relating to non-developed dough compositions leavened by chemical leavening systems that include an encapsulated basic chemical leavening agent, wherein the dough composition can be refrigerated in a low pressure package and can exhibit desired browning upon baking.

21 Claims, No Drawings

PACKAGED, NON-DEVELOPED DOUGH PRODUCT IN LOW PRESSURE PACKAGE, AND RELATED COMPOSITIONS AND METHODS

REFERENCE TO RELATED APPLICATIONS

This application claims the benefit of priority under 35 U.S.C. 119(e)(1) of a provisional patent application Ser. No. 60/572,463, filed May 19, 2004, which is incorporated herein by reference in its entirety.

FIELD OF THE INVENTION

The invention relates to refrigerator-stable, chemically-leavened, non-developed dough compositions, dough products, and methods for preparing the same.

BACKGROUND OF THE INVENTION

Today's commercial and consumer dough products are designed to accommodate consumer preferences in terms of convenience of use, storage stability, and organoleptic properties such as taste, texture, aroma, and color. One popular type of consumer dough product is the class of refrigerator-stable, chemically-leavened, non-developed dough products, a single example being refrigerated soda biscuits. These dough products are leavened substantially by the action of chemical leavening agents, as opposed to yeast, and they can be packaged to be stable over certain periods of time at refrigerated conditions.

Chemically-leavened, non-developed doughs contain chemical leavening agents in combination with typical dough ingredients such as flour, water, fat (e.g., solid fat or a liquid oil), and optional flavorants (e.g., salt or sweeteners) or other additives, which are combined to form a dough mass. As opposed to yeast-leavened doughs, a chemically-leavened dough is not leavened by the action of yeast. Instead, a chemically-leavened dough is leavened by the reaction between chemical leavening agents that, when in contact, produce a leavening gas such as carbon dioxide. This chemical reaction, and the resultant leavening of the dough, can occur at various times, such as during preparation of a dough, during refrigerated storage, or during baking. As opposed to yeast-leavened doughs, chemically-leavened doughs do not typically require a time-consuming "proofing" step before cooking, during which a dough is rested to allow yeast to metabolize. As such, a chemically-leavened dough composition can offer improved convenience compared to yeast-leavened dough compositions.

As noted above, consumers also appreciate the convenience of refrigerator-stable dough compositions, e.g., because of the convenience of allowing a refrigerated dough to be prepared, stored, and used at a convenient time. Refrigerated doughs should desirably produce a cooked dough product having properties comparable to cooked doughs prepared without an extended period of refrigerated storage, such as desired taste, aroma, texture, leavening properties, and color (e.g., surface browning). In practice, however, it can be a challenge to produce doughs that can be refrigerated for extended periods, and then cooked to qualities that are identical to doughs that have not been stored at refrigerated conditions. Chemically-leavened doughs that have been refrigerated for an amount of time (e.g., as little as two weeks) may exhibit undesired effects such as one or more of: a substantial, undesirable change in density (e.g., excessive leavening due to premature reaction between chemical leavening agents); discoloration of the stored and uncooked dough; diminished organoleptic properties of the cooked dough such as taste, texture, aroma, color etc.; reduced leavening properties during cooking; etc. Consequently, there exists an ongoing need for chemically-leavened refrigerated dough products that exhibit desired uncooked and cooked properties, during and after refrigerated storage.

SUMMARY OF THE INVENTION

Some past attempts to achieve refrigerated-storage stability in dough products have involved selection of dough ingredients such as encapsulated chemical leavening agents or low solubility chemical leavening agents. Encapsulated or low solubility chemical leavening agents can become less exposed to a dough or less dissolved in a dough component during refrigerated storage, and therefore can have a reduced tendency to react during storage, adding to stability during storage.

As an example, to control reaction of chemical leavening agents during refrigerated storage, some have used encapsulated basic chemical leavening agents that are designed to have a very high degree of encapsulation, e.g., a low activity, which means that particles of basic agent are very well covered by a coating of encapsulating agent. A high degree of encapsulation reduces the degree to which basic agent becomes exposed to a dough during storage, thereby preventing reaction between basic and acidic chemical leavening agents. Another consequence of a tightly encapsulated basic agent can be a reduction in dough pH.

It has further been found that a low dough pH in chemically-leavened dough compositions can inhibit browning of a dough surface during baking. See generally Applicants' co-pending U.S. patent application Ser. No. 10/417,608, ("DOUGH MADE WITH ENCAPSULATED SODA,") filed Apr. 17, 2003. Dough compositions brown during baking by a pH-dependent reaction known as Maillard browning. Maillard browning is a chemical reaction that occurs between reducing sugars and amino acids that come from peptides or proteins of the dough. The sugar and amino acid react, beginning at early stages of a baking cycle, to ultimately form brown pigments.

Without being bound by theory, a useful pH range for browning can depend on factors including the extent of development of a dough and amounts ingredients such as water and fat. A high fat content, non-developed dough structure can be more difficult to brown than a developed dough structure, because the surface temperature during baking of a non-developed dough will be lower (due, e.g., to less expansion of the dough and different heat transfer properties), making browning of such non-developed doughs more difficult. For non-developed, chemically-leavened doughs, Maillard browning has been found to best occur at a relatively neutral pH.

Embodiments of the invention involve dough compositions containing encapsulated basic chemical leavening agent that exhibits a degree of encapsulation that contributes to desired properties of a chemically leavened dough composition, over a period of refrigerated storage, such as a desired combination carbon dioxide evolution, leavening, and a relatively neutral pH.

According to embodiments of the invention, only a single composition of dough is required, meaning that, at least in terms of chemical leavening agents, a dough surface and interior are of the same composition, and features such as veneers of exterior dough, and control of exterior dough pH separate from interior dough pH, e.g., by surface coating an ingredient that affects pH (e.g., a base), are not required and can be avoided. This can be contrasted to Applicants' co-pending U.S. patent application Ser. No. 10/417,608, filed Apr. 17, 2003, which describes different pH levels at a dough interior compared to the dough exterior. The present description contemplates dough compositions having substantially uniform composition and substantially the same pH at interior and exterior locations. By using chemical leavening agents as discussed herein, non-developed dough compositions can be prepared to have stable interiors in terms of leavening and carbon dioxide production, and also to exhibit desired browning properties upon baking.

Certain non-developed, chemically-leavened dough compositions of the invention can exhibit desired stability during refrigerated storage, with respect to one or more of: a relatively neutral pH during refrigerated storage at a dough surface and interior; the ability to produce desired surface browning upon cooking, following refrigerated storage; desired leavening during refrigerated storage; desired amounts of carbon dioxide evolution during refrigerated storage; desired leavening upon cooking as indicated, e.g., by a baked specific volume; and combinations of these. As an example, an encapsulated basic chemical leavening agent may be selected based on its degree of encapsulation or "activity." A useful degree of encapsulation or activity can be an activity that allows a desired amount of basic agent to be released from encapsulation prior to baking, to result in desired stored and cooked dough properties.

The amount of release of basic agent from encapsulated materials, into a dough, during processing and refrigerated storage, can be affected by one or more of the use of specific encapsulating agents (e.g., hydrogenated vegetable oils), the extent of encapsulation (e.g., activity), and the degree of encapsulate damage. Thus, also according to certain embodiments of the invention, a dough composition can include encapsulated basic chemical leavening agent that is prepared by coating a basic agent with certain useful encapsulating agents, such as hydrogenated oils, and to exhibit useful activities, e.g., 60 to 90 percent for enrobed particles. Additionally, dough compositions may be prepared by methods that reduce or minimize damage to encapsulated particles.

Non-developed, chemically leavened dough compositions according to the invention can be packaged in low-pressure packaging, optionally while frozen and optionally with vacuum. In particular embodiments, a frozen dough can be placed in a flexible package that has sufficient volume to allow a degree of expansion of the dough composition within the flexible package. The dough can thaw in the package, and then, during refrigerated storage, can leaven to a degree that fills the volume of the package without producing excessive pressure inside the package, e.g., to produce a packaged dough product having an internal pressure that remains at approximately 1 atmosphere (absolute) during refrigerated storage, e.g., for up to or exceeding 8 weeks of refrigerated storage. A result can be a packaged dough product that contains little or no headspace produced by gas development (pouch ballooning), for extended periods such as at least 8 or 12 weeks.

Thus, certain embodiments of the invention include a non-developed dough composition packaged in a low pressure flexible package, optionally with little or no headspace. A low pressure package can mean a package that is substantially air tight, with an internal pressure that is typically less than 15 psig (pounds per square inch, absolute). Examples of low pressure packages include chubs and pouches that do not exhibit a pressurized interior. Low pressure packages specifically exclude pressurized cans and canisters, e.g., of cardboard, that contain dough products at an internal pressure of at least 15 psig.

As used herein, "normal" browning means a brown coloration that is typical and expected of a commercial non-developed baked dough product such as a biscuit or similar product. A desired color can be determined by visual inspection and comparison of color, after baking, to colors of desired baked products, or may be measured by quantitative measurement, e.g., by using a calorimeter. For example, when using the Minolta L browning test, known in the breadmaking arts, "normal" browning can mean a brown dough surface that produces a Minolta L reading of 71 or below.

An aspect of the invention relates to a refrigerator-stable dough product. The product includes a raw, non-developed, chemically-leavened dough in a low pressure package. The dough includes encapsulated basic chemical leavening agent and acidic chemical leavening agent. The dough surface and interior maintain a relatively neutral pH during refrigerated storage.

In another aspect, the invention relates to a packaged dough product that includes non-developed, chemically-leavened raw dough. The dough contains from 0.5 to 5, e.g., 0.5 to 3 weight percent encapsulated basic leavening agent (not including the weight of the encapsulating agent), from 0.25 to 2 weight percent non-encapsulated acidic chemical leavening agent, from 35 to 50 weight percent flour, from 20 to 40 weight percent water, from 5 to 20 weight percent fat. The dough is packaged in a low pressure package. After 12 weeks of refrigerated storage at 45 degrees Fahrenheit, the dough exhibits a pH in the range from 6.5 to 7.5.

In another aspect, the invention relates to a refrigerator-stable chemically-leavenable, non-developed dough. The dough includes acidic chemical leavening agent selected from the group consisting of sodium aluminum phosphate and sodium acid pyrophosphate, and encapsulated basic chemical leavening agent comprising enrobed particles comprising soda particles coated with encapsulating agent. The encapsulating agent comprises hydrogenated vegetable oil, and the enrobed particles have an activity in the range from 60 to 90 percent.

Still another aspect of the invention relates to a method of preparing a packaged dough product. The method includes providing a non-developed, chemically-leavened dough composition prepared from encapsulated basic chemical leavening agent, and acidic chemical leavening agent. The dough has a substantially neutral pH. The dough is placed in a low pressure package, stored at refrigerated storage temperature, and the pH of the dough is maintained at a substantially neutral pH during refrigerated storage. The dough surface browns normally during baking.

DETAILED DESCRIPTION

Dough compositions according to the invention are chemically-leavened, non-developed, dough compositions. Chemically-leavened (or "chemically-leavenable") dough compositions are dough compositions that leaven to a substantial extent by the action of chemical ingredients that react to produce a leavening gas. Typically, the ingredients include a basic chemical leavening agent and an acidic chemical leavening agent, the two of which react to produce carbon dioxide that when retained by the dough matrix causes the dough to expand. Chemically-leavened doughs can be contrasted to dough formulations that are substantially leavened due to the action of yeast as a leavening agent, i.e., by metabolic action of yeast on a substrate to produce carbon dioxide. While doughs of the invention can include yeast, e.g., as a flavoring agent, certain dough compositions of the invention do not include yeast as a leavening agent.

The degree of development of a dough (as in a "developed" versus a "non-developed" dough) generally refers to the strength of a dough's matrix, as the strength relates to the degree of development of gluten (protein) in a dough matrix. During processing of a dough composition, gluten can be caused or allowed to interact or react and "develop" a dough composition in a way that increases the stiffness, strength, and elasticity of the dough. Doughs commonly referred to as "developed" doughs are generally understood to include doughs that have a relatively highly-developed gluten matrix structure; a stiff, elastic rheology; and (due to the stiff, elastic matrix) are well able to form bubbles or cells that can stretch without breaking to hold a leavening gas while the dough expands, leavens, or rises, prior to or during cooking (e.g., baking). Features that are sometimes associated with a developed dough, in addition to a stiff, elastic rheology, include a liquid content, e.g., water content, that is relatively high compared to non-developed doughs; a sufficient (e.g., relatively high) protein content to allow for a highly-developed structure; optionally, processing steps that include time to allow the dough ingredients (e.g., gluten) to interact and "develop" to strengthen the dough; and on average a baked specific volume that is relatively higher than non-developed doughs. Oftentimes, developed doughs are yeast-leavened, but may be chemically leavened. Examples of specific types of doughs that can be considered to be developed doughs include doughs for pizza crust, breads (loaves, dinner rolls, baguettes, bread sticks), raised donuts, cinnamon rolls, croissants, Danishes, pretzels, etc.

As compared to "developed" doughs, doughs commonly referred to as non-developed (or "un-developed" or "under-developed") have a relatively less developed ("undeveloped") dough matrix that gives the dough a relatively non-elastic rheology, reduced strength, and reduced gas-holding capacity. Being less elastic than a developed dough and exhibiting a reduced gas-holding capacity, non-developed doughs, on average, exhibit relatively lower raw and baked specific volumes.

Chemically-leavened, non-developed, dough compositions can be prepared from ingredients generally known in the dough and bread-making arts, typically including flour, a liquid component such as oil or water, a chemical leavening system, fat (solid or liquid), and optionally additional ingredients such as salt, sweeteners, dairy products, egg products, processing aids, emulsifiers, particulates, dough conditioners, yeast as a flavorant, other flavorings, and the like. Exemplary compositions do not include yeast as a leavening agent, and such doughs are leavened entirely based on the action of the chemical leavening agents.

Acidic chemical leavening agents (or "acidic agents") that may be useful according to the invention include those generally known in the dough and bread-making arts. Acidic agents may be relatively soluble or insoluble within different temperature ranges, and may or may not be encapsulated. Examples of acidic agents include sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dihydrate (DCPD), glucono-delta-lactone (GDL), as well as a variety of others. Commercially available acidic chemical leavening agents include those sold under the trade names: Levn-Lite® (SALP), Pan-O-Lite® (SALP+ MCP), STABIL-9® (SALP+AMCP), PY-RAN® (AMCP), and HT® MCP (MCP).

According to embodiments of the invention, an acidic chemical leavening agent can be selected, in combination with other ingredients, to provide a dough composition with desired refrigerated-storage stability including one or a combination of desired pH properties, taste, texture, and baked color (e.g., browning) properties, etc., and desired carbon dioxide production and leavening during refrigerated storage. According to such exemplary embodiments, the acidic chemical leavening agent can be of a type that is only slightly soluble in an aqueous component of a dough composition at processing and refrigerated storage temperatures, which include temperatures above freezing (32 F) and up to room temperature (e.g., 70 F). An acidic agent having this relatively low solubility can contribute to storage stability, for example by preventing dissolution of the acidic agent, thereby preventing a substantial reduction in dough pH. By preventing dissolution, the acidic agent is also inhibited from reacting with the basic agent to produce carbon dioxide during processing and refrigerated storage, which carbon dioxide can cause an undesired degree of expansion of the dough, carbon dioxide evolution into a sealed package, or both, during processing or refrigerated storage.

Particularly useful acidic chemical leavening agents include SALP and relatively slower reacting SAPP (e.g., low activity SAPP, for example SAPP-RD-1, 26, 28) and other acidic agents that exhibit solubility behavior similar to SALP and low activity SAPP.

The amount of acidic chemical leavening agent used in a dough composition can be an amount sufficient to provide desired dough properties as described herein, including— considering, e.g., the solubility of an acidic agent and whether the agent is encapsulated—an amount that provides a single dough formulation having refrigerated storage stability as discussed herein, including desired pH, carbon dioxide evolution, and leavening properties during storage, and desired leavening and browning properties upon baking. The amount of an acidic agent can be an amount to neutralize an amount of basic chemical leavening agent during refrigerated storage or baking, to achieve such desired properties. Exemplary amounts can be stoichiometric to neutralize the amount of basic chemical leavening agent contained in the same dough composition. A typical amount of acidic agent such as SALP may be in the range from about 0.25 to about 2 parts by weight per 100 parts dough composition, with ranges from about 0.25 to about 1.5 parts by weight per 100 parts dough composition sometimes being particularly useful. These amounts, and amounts of acidic agent identified throughout the present application and claims, do not including encapsulating agent unless otherwise noted.

The dough composition also includes basic chemical leavening agent (or "basic agent"), which is encapsulated. Useful basic chemical leavening agents are generally known in the dough and baking arts, and include soda, i.e., sodium bicarbonate ($NaHCO_3$), potassium bicarbonate ($KHCO_3$), ammonium bicarbonate ($NH_4HCO_3$), etc. These and similar types of basic chemical leavening agents are generally soluble in an aqueous component of a dough composition at processing and refrigerated storage temperatures.

The terms "encapsulated basic chemical leavening agent" and "encapsulated basic agent" refer to ingredients that include solid basic chemical leavening agent particulates covered at least in part, normally completely or substantially completely, by an encapsulating agent (sometimes also referred to as "barrier material."). Encapsulated basic chemical leavening agent particles are known in the baking arts, and include encapsulated particles sometimes referred to as "enrobed" particles, as well as those sometimes referred to as "agglomerated" particles. The encapsulating agent forms a coating or shell around a single or multiple particulates of solid basic chemical leavening agent. "Enrobed" particles generally include a single particulate of chemical leavening agent covered or coated by encapsulating agent, and "agglomerate" particles generally include 2, 3, or more particulates of chemical leavening agent contained in a mass of encapsulating agent.

Encapsulating the basic chemical leavening agent provides separation between the basic agent and the bulk of the dough composition. Still, encapsulating processes and encapsulating agents do not normally result in perfect encapsulation of basic agents. Instead, cracks or open areas of coatings of encapsulating material normally allow at least some small amount of basic agent to be exposed. Further, encapsulated particles may sometimes be damaged during preparation of a dough composition, such as during mixing of ingredients. The result of such imperfect encapsulation is that some amount of basic agent is released from encapsulation into a dough composition, prior to baking, e.g., during preparation or processing of a dough composition or during refrigerated storage.

According to embodiments of the invention, the amount of basic agent that is released due to imperfect encapsulation (optionally in combination with selective activity of encapsulated basic agent particles) can be an amount that results in desired refrigerated-storage stability of a dough composition, e.g.: an amount that results in a single dough formulation that exhibits desirably low carbon dioxide production, and leavening, during refrigerated storage; an amount that results in a relatively neutral pH during refrigerated storage (the pH will normally be approximately the same at the surface and interior of the dough); or an amount that results in desired browning of a dough composition after extended refrigerated storage.

While acidic agent can be only slightly soluble at processing and refrigerated temperatures, even those acidic agents will dissolve to some extent in the aqueous component of a dough composition at processing or refrigerated temperatures. If not neutralized by a base, the dissolved acidic agent will cause a reduction of the pH of the dough composition (surface and interior). If the pH is reduced too far, i.e., if a sufficient amount of acidic chemical leavening agent dissolves and is not neutralized, the pH of the dough composition, including the interior and surface portions, can be reduced to a level that does not allow the dough composition surface to brown normally during baking.

Thus, dough compositions of the invention can contain encapsulated basic agent (e.g., in combination with relatively low solubility acidic agent) wherein the amount of the encapsulated basic agent and the degree and nature of its encapsulation allow a desired amount of the encapsulated basic agent to be released during processing and refrigerated storage to maintain a relatively neutral pH during refrigerated storage and until early baking, to produce desired browning upon baking. Also according to such embodiments, the amount of encapsulated basic agent and its degree of encapsulation can contribute to a desirably low degree of carbon dioxide production during refrigerated storage, and desired leavening during processing, refrigerated storage, and baking. Such embodiments of a single dough formulation can exhibit storage stability including desired amounts of carbon dioxide release and leavening during processing and refrigerated storage (based substantially on the properties of the interior of the dough composition), and desired baking properties such as desired leavening and desired browning (browning being based substantially on the pH at the dough surface).

The degree of encapsulation of encapsulated basic particles (and, therefore, to a large degree, the extent of release of the basic agent from the encapsulated particles during processing and refrigerated storage) can be affected by factors such as the composition of the basic agent; the composition and relative amount of the encapsulating agent; the type, quality, and amount of the encapsulating agent coating; and the amount of damage that occurs to the encapsulated particles during processing.

The degree of encapsulation can be discussed in various terms. The degree of encapsulation refers to how well particulates of a basic agent are covered by or enclosed by an encapsulating agent, and, therefore, the effectiveness with which an encapsulating agent coating separates the basic agent from a bulk dough composition prior to cooking. Features that provide a high degree of encapsulation include a high percentage of coverage of basic agent particulates by encapsulating agent, a low amount of cracking of the encapsulating agent, and a low amount of damage to encapsulated particles. Conversely, a low degree of encapsulation can exist if there is a low percentage of coverage of basic agent particulates by a barrier material, a high amount of cracks in the barrier material coating, or a large degree of damage to encapsulated particles.

One measure that may be useful to quantify degree of encapsulation of an encapsulated leavening agent is "activity," which refers to the percentage by weight of active ingredient that is contained in encapsulated particles, based on the total weight of the particles. According to the invention, a desired activity of an encapsulated basic chemical leavening agent can be an activity that provides desired refrigerated-storage stability as discussed, e.g., desired carbon dioxide release, leavening, pH, and browning properties, when the encapsulated agent is distributed throughout the dough, including the dough interior and surface. Examples of useful activities of encapsulated basic agent, when included in a chemically-leavened, non-developed dough composition in combination with a relatively insoluble acidic agent such as SALP, or SAPP, can be, e.g., in the range from 60 to 90 percent, e.g., in the range from 65 to 85 percent.

The encapsulating agent can be any material that can be coated as an encapsulating agent to provide encapsulated particles that exhibit desired degrees of separation and release of a basic agent during processing, refrigerated storage, and cooking. The encapsulating agent can provide sufficient separation during processing and refrigerated storage to allow release of only an amount of basic agent that will desirably affect pH and carbon dioxide production, e.g., an amount of base that will maintain relatively a neutral pH, by reacting with a relatively small amount of dissolved, relatively insoluble acidic agent. Upon cooking, the encapsulating agent degrades (e.g., melts) to release substantially all of the remaining encapsulated basic agent. (Also upon cooking, acidic agent is substantially soluble.). Thus, an encapsulating agent may exhibit a melting point that causes the encapsulating agent take the form of a stable, hydrophobic solid at dough preparation, packaging, and storage temperatures, and that causes the barrier material to break down (e.g., melt) during baking. If oven temperature during baking is generally about 300 to 500 F, exemplary melting points of encapsulating agents are generally lower, e.g., greater than 100 F, so that a melting point is somewhat higher than refrigerated storage or room temperature, and is a temperature that the dough composition experiences during baking, but is not necessarily the temperature of the set point of the oven during baking. A more specific range of melting points can be within the temperature range experienced by the dough composition during early stages of baking, such as from about 100 F to about 200 F.

Exemplary encapsulating agents include hydrophobic materials such as fats and emulsifiers. Examples of useful encapsulating agents include oils such as hydrogenated vegetable oils, including hydrogenated soybean oil, hydrogenated cotton oil, hydrogenated palm oil, hydrogenated palm kernel oil, hydrogenated canola oil, or any other hydrogenated vegetable oils, any of which may be used alone or in mixtures. Synthetic analogs of any of these may also be useful.

Encapsulated particles containing basic chemical leavening agent can be prepared by methods known in the baking and encapsulation arts. An example of a method for producing enrobed particles is the use of a fluidized bed. According to this method, core particulates and encapsulating agent are concurrently introduced into a fluidized bed. As the two materials are present in the fluidized bed, the encapsulating agent becomes coated on the surface of the core particulate. The longer the particulate is present in the fluidized bed, the thicker the coating of encapsulating agent becomes. Typical particles can include 1, 2, or 3 particulates per encapsulated particle. To prepare encapsulated particles containing basic chemical leavening with a desired degree of encapsulation (e.g., activity) parameters of encapsulation can be controlled to affect amount of coverage (e.g., the amount and thickness of the barrier material).

The amount of encapsulated basic chemical leavening agent used in a dough composition can be sufficient, in combination with its degree of encapsulation (e.g., activity) and the amount and type of acidic agent, to produce a dough composition as described herein, having one or more of the desired pH, browning, carbon dioxide-release, and leavening properties. Often, a total amount of basic agent that is stoichiometric to the amount of acidic agent, can be useful, as well as ranges above and below a stoichiometric amount. Useful amounts of basic chemical leavening agent may be in the range from about 0.25 to about 5 weight percent basic agent based on the total weight of a dough composition, e.g., from 0.25 to 4 weight percent, from 0.5 to 3 weight percent, or from 0.75 to 1.5 weight percent. For purposes of the present description and claims, amount of basic chemical leavening agents are provided in amounts that do not include weight of encapsulating agent.

Non-developed dough compositions containing acidic agent (e.g., non-encapsulated, slightly soluble) and encapsulated basic agent having a degree of encapsulation as described herein, can provide dough compositions having very good refrigerated storage stability, e.g., in terms of one or more of pH and browning properties over extended refrigerated storage; carbon dioxide release and leavening properties during refrigerated storage; and leavening upon baking after refrigerated storage.

Exemplary dough compositions can exhibit surface and internal pH levels that remain relatively neutral during refrigerated storage, e.g., that is in the range from 6 to 8, e.g., 6.5 to 7.5, over an 8, 10, or 12 week period of time while stored at 45 degrees Fahrenheit. Such doughs can also exhibit normal browning upon baking following any such storage period. Surface and interior pH of the dough will be approximately similar. Surface and interior dough pH can be measured by standard methods.

Exemplary dough compositions can evolve less than 80 cubic centimeters (cc) of carbon dioxide per 125 grams of dough over an 8, 10, or 12 week period of time while stored at 45 degrees Fahrenheit, e.g., from 60 to 80 cc of carbon dioxide per 125 grams over 8, 10, or 12 weeks at 45° F. Such a dough can undergo a desired amount of leavening during such period of refrigerated storage, to produce a dough composition having a raw specific volume in the range from 0.9 to 1.6 cc/gram.

Upon baking, exemplary dough compositions of the invention can exhibit leavening and baked specific volume properties that are typical of normal non-developed doughs, e.g., can be baked to a specific volume of at least 2 or 2.5 cc/g, e.g., from 2.5 to 3.4 cc/g.

A non-developed, chemically-leavened dough composition according to the invention can include other dough ingredients as known in the dough and baking arts, or as developed in the future to be useful with chemically-leavened, non-developed dough compositions.

A flour component can be any suitable flour or combination of flours, including glutenous and nonglutenous flours, and combinations thereof. The flour or flours can be whole grain flour, flour with the bran and/or germ removed, or combinations thereof. Typically, a dough composition can include between about 30 and about 50 weight percent flour, e.g., from about 35 to about 45 weight percent flour, based on the total weight of a dough composition.

Examples of liquid components include water, milk, eggs, and oil, or any combination of these, as will be understood to be useful in chemically-leavened, non-developed dough compositions. For example, a liquid component may be water (added as an ingredient and as part of other ingredients), e.g., in an amount in the range from about 15 to 35 weight percent, although amounts outside of this range may also be useful. Water may be added during processing in the form of ice, to control the dough temperature in-process; the amount of any such water used is included in the amount of liquid components. The amount of liquid components included in any particular dough composition can depend on a variety of factors including the desired moisture content of the dough composition. Typically, liquids can be present in a dough composition in an amount between about 15% by weight and about 35% by weight, e.g., water in an amount in the range from 25 to 35 weight percent based on total weight of a dough composition.

The dough composition can optionally include fat ingredients such as oils and shortenings. Examples of suitable oils include soybean oil, corn oil, canola oil, sunflower oil, and other vegetable oils. Examples of suitable shortenings include animal fats and hydrogenated vegetable oils. Fat may be used in an amount less than about 20 percent by weight, often in a range from 5 or 10 weight percent to 20 weight percent fat, based on total weight of a dough composition.

The dough composition can optionally include one or more sweeteners, either natural or artificial, liquid or dry. Examples of suitable dry sweeteners include lactose, sucrose, fructose, dextrose, maltose, corresponding sugar alcohols, and mixtures thereof.

Dough compositions described herein can be prepared according to methods and steps that are known in the dough and dough product arts. These can include steps of mixing or blending ingredients, folding, lapping, forming, shaping, cutting, rolling, filling, etc., which are steps well known in the dough and baking arts.

Dough compositions as described can be prepared by methods that prevent or avoid substantial or excessive damage to encapsulated basic chemical leavening agent particles. Methods of incorporating encapsulated basic chemical leavening agent into a dough composition can include using reduced amounts of shear, such as by using high speed or high shear mixing for a reduced amount of time, or by using a low shear method. Such methods are described in Assignee's co-pending U.S. patent application Ser. No. 10/224,886, entitled Methods of Incorporating Encapsulated Chemical Leavening Agent into Dough Ingredients, and Compositions So Prepared, filed Aug. 21, 2002, the entirety of which is incorporated herein by reference.

The terms "high speed" and "high shear" are used in a manner consistent with the terms' understood meanings, and as used herein include mixing methods that will result in more than 15 percent of encapsulated particles of a dough composition being damaged upon being mixed and uniformly distributed in the dough composition. "High speed" mixing generally refers to the use of standard bowl-type mixer with reciprocating, rotating, orbital, or spinning "beaters" or other mechanically impinging utensils that reciprocate or rotate at speeds equal to or in excess of 72 revolutions per minute (rpm), and other methods that result in similar amounts of shear.

According to certain embodiments of the invention, encapsulated basic agent can be incorporated into a dough composition using low shear. A low shear mixing step can be a step that results in damage to less than 15 percent of encapsulated particles of a dough composition, e.g., less than 10 percent, or less than 5 percent or less than 3 percent of encapsulated particles. Generally, low shear mixing steps are used to wet out dry ingredients, to combine ingredients without causing splash or dust formation, or both. Examples of low shear mixing steps include mixing using a conventional large-scale bowl mixer at speeds below 36 rpm and for a time that causes damage to not more than 15 percent of encapsulated particles, e.g., for less than about 300 seconds, as well as other mixing methods that result in similar amounts of shear. Other examples of low shear mixing steps include sheeting, folding, lapping, kneading, enrobing, and rolling steps, which can cause damage to very low amounts of encapsulated particles, e.g., less than 5 or 3 percent.

According to other embodiments, an encapsulated basic agent can be incorporated into a dough composition using a high speed or high shear mixing step, but for an amount of time to limit the amount of damage to the encapsulated particles. For example, a method of preparing a dough composition may include one or more high speed mixing steps that produce sufficiently high shear for a sufficient length of time to uniformly distribute dough ingredients in a dough composition. The one or more high speed mixing steps may, for example, be for periods of from 200 to about 400 seconds, and at a speed of from 36 to about 72 rpm. To reduce the amount of shear experienced by encapsulated particles, particles may be added after some portion of a high speed mixing step has been completed, so that the encapsulated basic chemical leavening agent particles are mixed at high speed for only a portion of the total high speed mixing period. Specifically, after a portion of a high speed mixing period has been completed, e.g., after about half of a total intended high speed mix period (e.g., after about 1.5 to 2.5 minutes), encapsulate basic chemical leavening agent particles can be added. Optionally, the mixing speed can be slowed to slow speed for a period sufficient to gradually add the encapsulated particles. Then the mixing speed can be increased again to high speed for a time sufficient to uniformly incorporate the encapsulated basic chemical leavening agent particles into the other ingredients. The period of high speed mixing can expose encapsulated basic chemical leavening agent particles to less damage than would the full high speed mixing period, resulting in damage to, e.g., not more than 15 percent of the encapsulated basic chemical leavening agent particles.

Mixing may be performed in commercially available and well-known equipment, for example a horizontal bar mixer with a cooling jacket (e.g., a 2500 lb. horizontal bar mixer from Oshikiri in Japan). The dough ingredients can be added separately or in combinations, and can be mixed at one or more speeds, sometimes in stages, until a proper consistency is achieved and all ingredients are substantially uniformly dispersed in a dough composition. A total of from about 5 minutes to about 45 minutes high and/or low speed mixing time can be typical to produce a uniform dough composition, optionally by adding ingredients or combinations of ingredients sequentially over two or more mixing stages.

A dough composition can be further processed as desired to prepare a final dough composition. Depending on the type of final dough composition, certain steps of sheeting, folding, lapping with and with out shortening or fat, enrobing, cutting, filling, and shaping, can be used to form a particular shape and form of dough product.

The dough composition can be packaged and sold in a form that can be refrigerator-stable. An example of a packaging configuration is a non-pressurized plastic tube, chub, or pouch containing individual portions of a dough composition such as biscuits. Another general example of a low pressure package can include packaging configurations that generally include a rigid material such as a rigid plastic tray and a flexible film portion that closes the tray, optionally but not necessarily including a pressure relief valve. Any materials and techniques can be used for the packaging. Typical such biscuit products are often packaged and sold in pressurized containers such as cardboard cans. The inventive dough has the advantage of being capable of being packaged without taking special measures to pressurize the package.

Exemplary packaging that may be useful is non-pressurized pouch, tube, or chub packaging can include plastic materials that act as an adequate oxygen barrier, to promote storage and freshness. A non-pressurized container means that the packaging is not intended maintain a pressurized (greater than approximately 1 atm) interior space. The packaging material does not require a pressure relief valve.

The packaging can be flexible, and may be prepared from materials such as paper or polymeric materials, such as polymeric (e.g., plastic) film. A polymeric film may be prepared from generally well known packaging material polymers such as different polyesters (e.g., PET), nylons, polyolefins (e.g., polyethylene), vinyls, polyalcohols, etc.

According to certain embodiments of the invention, the dough composition can be packaged in an unproofed condition, and can leaven (e.g., proof or partially proof) while packaged, e.g., during refrigerated storage. For example, an unproofed dough composition, e.g., having a raw specific volume in the range from 0.9 to 1.2 cc/g, can be placed in a flexible package, optionally with reduced or limited headspace. During refrigerated storage, the unproofed dough composition can experience an amount of leavening (e.g., partial proofing) while inside the package, e.g., to result in a raw specific volume of a partially-proofed dough composition, e.g., from 1.2 to 1.6 cc/g. This leavening occurs due to reaction of the acidic and encapsulated basic chemical leavening agents. The package containing the unproofed dough composition can be flexible but not necessarily stretchable, and can optionally be evacuated to contain folds or wrinkles, or otherwise be of a form, e.g., geometry or shape, or combination of these, to allow an increase in internal volume of the flexible package without substantial stretching, to accommodate an increase in volume of the dough composition while inside the flexible package, during refrigerated storage. Examples of packaging materials and methods of packaging chemically-leavened doughs are discussed, e.g., in Applicant's copending United States patent application, entitled "PACKAGED DOUGH PRODUCT IN FLEXIBLE PACKAGE, AND RELATED METHODS," U.S. Ser. No. 10/446,481, filed May 28, 2003, the entire disclosure of which is incorporated herein by reference.

The flexible package can be sized to accommodate the leavened (e.g., partially-proofed) dough composition, meaning that the flexible package is of sufficient size (volume) to contain the unproofed dough composition, with volume left over to allow the dough to expand to some degree inside of the package. For example, the fully sized (with minimal stretching) volume of the flexible package may be from about 1.1 to about 1.5 times the volume of the unproofed dough composition. Matching the fully sized volume of the package to the approximate volume of the expanded (e.g., partially-proofed during refrigerated storage) dough composition can allow a leavened dough composition to fit well in the package with limited headspace and without a pressurized interior. Examples of useful internal pressures of a packaged dough product, following partial proofing or other expansion of the dough composition during refrigerated storage, can be below 1.5 atm, e.g., from 1 to 1.3 atm (absolute).

Thus, embodiments of the invention allow placing unproofed dough composition into a flexible package, with reduced or limited headspace, and allowing the dough composition to leaven, e.g., partially proof, while in the package, to produce a packaged dough product also containing limited headspace and low internal pressure (e.g., approximately one atmosphere, absolute). During leavening of the dough composition inside the flexible package, the internal volume of the flexible package can increase to accommodate the expanding dough composition by a change in form of the packaging material (e.g., un-wrinkling of the package or change in the shape), with minimal stretching.

An expanded (e.g., partially proofed) volume of an amount of packaged dough composition can be calculated ahead of time so the fully sized volume of the package can accommodate the expanded volume of the dough. The fully sized volume of the flexible package can be approximately equal to the volume of the expanded dough composition, with limited headspace or essentially no headspace, and with the internal pressure of the packaged dough product containing the proofed dough composition being relatively low (e.g., approximately one atmosphere). This can occur without substantial stretching of the flexible packaging material, e.g., with less than 10% stretching of the flexible package in any one direction, less than 5%, or less than 2% stretching in any one direction.

According to one exemplary mode of providing an unproofed dough composition in a package for partial proofing, a packaging material (having an unstretched internal volume greater than the volume of the unproofed dough composition) can conform to an unproofed dough composition by wrinkling, folding, or otherwise being shaped to conform to the volume of the contained unproofed dough composition, e.g., optionally by using a vacuum. A dough composition can be placed into an oversized flexible package and the flexible package can be collapsed upon or shaped to conform to the dough composition, to eliminate headspace. Headspace can be removed mechanically or with vacuum. The dough composition can be frozen when packaged, if vacuum is used to reduce headspace, because the frozen dough composition is less susceptible to damage. The package can then be sealed.

Optionally, headspace can be removed using vacuum to produce a negative pressure inside a packaging vacuum chamber prior to sealing the pouch then allowing the pressure within the chamber to equilibrate to atmospheric pressure thereby collapsing the film completely about the dough. A negative pressure is a pressure below atmospheric pressure, e.g., less than 1 atmosphere (0 psig). According to one specific such method, a packaging chamber is evacuated to 0-3 millibar (mb), prior to sealing the package. Subsequent to sealing, the vacuum in the chamber is released and the film collapses around the dough as the chamber equilibrates to atmospheric pressure. The dough and package are at 1 atmosphere. The packaging material conforms and collapses about the dough. The packaged dough can expand within the package, to fill the volume of the package by causing the package to unwrinkled, and without requiring the package material to substantially stretch.

Exemplary embodiments of the invention are described herein. Variations on the exemplary embodiments will become apparent to those of skill in the relevant arts upon reading this description. The inventors expect those of skill to use such variations as appropriate, and intend for the invention to be practiced otherwise than specifically described herein. Accordingly, the invention includes all modifications and equivalents of the subject matter recited in the claims as permitted by applicable law. Moreover, any combination of the above-described elements in all possible variations thereof is encompassed by the invention unless otherwise indicated.

Following are examples of dough formulations of the invention.

Gluzyme (Gluzyme 2500 BG) is the trade name for the enzyme glucose oxidase manufactured by Novozymes North America Inc. Of the two listed flours, the first is a hard flour and the second is a soft wheat flour. Both samples were stored for approximately 12 weeks at 45° F. and browned in satisfactory manner upon baking.

Compositions Containing 70% and 85% Active e-soda

| Ingredient | | % | gm |
|---|---|---|---|
| 1st Stage | | | |
| flour | | 38.9199 | 1945.995 |
| flour | | 8.8 | 440 |
| water | | 17.615 | 880.75 |
| ice | | 9.075 | 453.75 |
| shortening | | | 0 |
| xanthan gum | | 0.13 | 6.5 |
| PGA* | | 0.05 | 2.5 |
| Gluzyme | | 0.001 | 0.05 |
| 2nd Stage | | | |
| shortening chips | | 7.49 | 374.5 |
| sugar | | 5.42 | 271 |
| SALP | | 1 | 50 |
| salt | | 1.28 | 64 |
| 3rd Stage | | | |
| E-soda | | See below | See below |
| Run 1 | | | |
| e-soda | 70% active | 1.43 | 71.5 |
| Run 2 | | | |
| e-soda | 85% active | 1.176 | 58.8 |
| shortening | | 9.044 | 452.2 |

*Add PGA to 100 gm 1st stage flour and mix thoroughly prior to combining with other 1st stage ingredients.

Spiral Mixer Process
First Stage Mix
1) Soften/melt shortening
2) Combine first stage dry ingredients in an iced mixing bowl.
3) Add melted shortening.
4) Mix slow for 30 seconds.

5) Mix high for 180 seconds.
Second Stage Mix
6) Cut-in second stage fines and added shortening chips (excluding e-soda).
7) Mix slow for 30 seconds.
8) Mix high for 105 seconds.
Third Stage Mix
9) Cut in e-soda.
10) Mix slow 30 seconds.
11) Mix high 105 seconds.
Sheeting
12) Sheet 5K dough pad to 12 mm. Start at 45 mm and reduce gap width by 5 mm increments
to 15 mm, then make final pass at 12 mm.
13) 3 fold and rotate dough pad 90°.
14) Repeat step 12.
Cutting/Packaging
15) Round cut biscuits to 63 gm+/−3 gm.
16) Package 14 two biscuit pouches/batch (flush with 100% N2 gas)
17) Store product in 45° F. rolling racks.
Two runs were performed to produce biscuits from encapsulated basic chemical leavening agents that had a 70 percent activity and an 85 percent activity.

I claim:

1. A refrigerator-stable dough product comprising a raw non-developed, chemically-leavened dough composition in a low pressure package, the dough composition comprising
   encapsulated basic chemical leavening agent having an activity in the range from 60 to 90 percent, and
   acidic chemical leavening agent selected from the group consisting of sodium aluminum phosphate and sodium acid pyrophosphate, and
   glucose oxidase,
   wherein the package comprises an interior atmosphere that is evacuated.

2. The product of claim 1 wherein the encapsulated basic chemical leavening agent comprises soda particles coated with encapsulating agent, wherein the encapsulating agent is a hydrogenated vegetable oil.

3. The product of claim 2 wherein
   the acidic chemical leavening is non-encapsulated, and
   the encapsulated basic chemical leavening exhibits a degree of encapsulation that allows leaching of basic chemical leavening agent during refrigerated storage to maintain a dough pH level that allows normal browning upon baking for at least 12 weeks at refrigerated storage.

4. The product of claim 1 wherein after 2 weeks of storage at 45 degrees Fahrenheit, surface pH of the dough is in the range from 6.5 to 7.5.

5. The product of claim 1 wherein after 2 weeks of refrigerated storage at 45 degrees Fahrenheit, the raw specific volume of the dough is in the range from 0.9 to 1.6 cubic centimeters per gram.

6. The product of claim 5 wherein after 2 weeks of refrigerated storage at 45 degrees Fahrenheit, the dough can be baked to a baked specific volume in the range from 2.5 to 3.4 cubic centimeters per gram.

7. The product of claim 1 wherein the dough composition is a biscuit.

8. The product of claim 1 comprising
   from 0.25 to 1.5 weight percent encapsulated basic chemical leavening agent, and
   an amount of non-encapsulated acidic chemical leavening agent at least sufficient to stoichiometrically neutralize the amount of basic chemical leavening agent.

9. The product of claim 1 wherein the dough comprises
   from 35 to 50 weight percent flour,
   from 5 to 20 weight percent fat,
   from 0.25 to 2 weight percent non-encapsulated acidic chemical leavening agent, and
   from 0.25 to 4 weight percent encapsulated basic chemical leavening agent, based on the total weight of the dough composition.

10. The product of claim 1 wherein the low pressure package is selected from the group consisting of a chub and a pouch, the low pressure package containing an interior atmosphere that is evacuated.

11. A refrigerator stable packaged dough product comprising
   non-developed, chemically-leavened raw dough composition comprising
      from 0.25 to 5 weight percent encapsulated basic leavening agent and,
      from 0.25 to 2 weight percent non-encapsulated acidic chemical leavening agent
      from 35 to 50 weight percent flour,
      from 5 to 20 weight percent fat, and
      glucose oxidase,
   packaged in a low pressure package,
   wherein the package comprises an interior atmosphere that is evacuated.

12. The product of claim 11 wherein the low pressure package is unvented, and comprises flexible film.

13. A refrigerator-stable chemically-leavenable, non-developed dough composition comprising
   acidic chemical leavening agent selected from the group consisting of sodium aluminum phosphate and sodium acid pyrophosphate, and
   encapsulated basic chemical leavening agent comprising enrobed particles comprising soda particles coated with encapsulating agent, wherein the encapsulating agent comprises hydrogenated vegetable oil,
   glucose oxidase, and
   the enrobed particles have an activity in the range from 60 to 90 percent wherein the package comprises an interior atmosphere that is evacuated.

14. The product of claim 13 wherein the encapsulated basic chemical leavening agent comprises enrobed particles having an activity in the range from 65 to 85 percent.

15. A method of preparing a refrigerator-stable packaged dough product, the method comprising
   providing a non-developed, chemically-leavened dough composition comprising
      encapsulated basic chemical leavening agent having an activity in the range from 60 to 90 percent, and
      acidic chemical leavening agent selected from the group consisting of sodium aluminum phosphate and sodium acid pyrophosphate, and
      glucose oxidase,
   placing the dough composition into a low pressure package,
   evacuating the package, and
   storing the dough composition at refrigerated storage temperature for a period in the range from 2 to 18 weeks.

16. The method of claim 15 comprising
   maintaining internal and external dough pH levels in a range from 6.5 to 7.5 during refrigerated storage, and
   baking the dough composition.

17. The method of claim 15 wherein the dough, after 12 weeks of refrigerated storage, has a raw specific volume in the range from 0.9 to 1.6.

18. The method of claim 15 wherein the dough composition evolves less than 80 cubic centimeters of carbon dioxide per 125 grams of dough over 12 weeks while stored at 45 degrees Fahrenheit.

19. The method of claim 15 wherein after 12 weeks of refrigerated storage
the dough composition has a raw specific volume in the range from 0.9 to 1.6 cubic centimeters per gram,
the dough composition can be baked to a baked specific volume in the range from 2.5 to 3.4 cubic centimeters per gram.

20. The dough product of claim 1 wherein the surface maintains a pH in the range from 6 to 8 after 8 weeks of refrigerated storage.

21. The dough product of claim 3 wherein the dough browns to a Minolta L surface reading of 71 or below.

* * * * *